United States Patent
Li et al.

(10) Patent No.: US 9,246,590 B2
(45) Date of Patent: Jan. 26, 2016

(54) SMART OPTICAL TRANSCEIVER HAVING INTEGRATED OPTICAL DYING GASP FUNCTION

(75) Inventors: Wen Li, Fremont, CA (US); Fulin Pan, Fremont, CA (US); Jianhui Zhou, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 2036 days.

(21) Appl. No.: 12/390,484

(22) Filed: Feb. 22, 2009

(65) Prior Publication Data

US 2010/0215359 A1    Aug. 26, 2010

(51) Int. Cl.
*H04B 10/40*   (2013.01)

(52) U.S. Cl.
CPC ..................... *H04B 10/40* (2013.01)

(58) Field of Classification Search
USPC ....................................... 398/17, 22
See application file for complete search history.

(56) References Cited

U.S. PATENT DOCUMENTS

| | | | |
|---|---|---|---|
| 5,523,868 A * | 6/1996 | Hawley | 398/38 |
| 5,680,234 A | 10/1997 | Darcie | |
| 5,694,234 A | 12/1997 | Darcie | |
| 5,864,413 A | 1/1999 | Feldman | |
| 5,907,417 A | 5/1999 | Darcie | |
| 6,151,144 A | 11/2000 | Knox | |
| 6,304,350 B1 | 10/2001 | Doerr | |
| 6,381,047 B1 | 4/2002 | Frigo | |
| 6,411,410 B1 | 6/2002 | Wright | |
| 6,721,506 B1 | 4/2004 | Lam | |
| 7,302,352 B2 * | 11/2007 | Chuang | 702/58 |
| 7,809,262 B2 * | 10/2010 | Mahony et al. | 398/10 |
| 2002/0039214 A1 | 4/2002 | Ruan | |
| 2002/0186439 A1 | 12/2002 | Buabbud | |
| 2003/0180049 A1 | 9/2003 | Park | |
| 2004/0091265 A1 | 5/2004 | Kim | |
| 2005/0041971 A1 | 2/2005 | Lee | |
| 2006/0082866 A1 | 4/2006 | Takahashi | |
| 2006/0110157 A1 * | 5/2006 | Tritschler et al. | 398/22 |
| 2006/0147211 A1 | 7/2006 | Kim | |
| 2006/0153566 A1 | 7/2006 | Sorin | |
| 2007/0116466 A1 | 5/2007 | Gewirtzman | |
| 2007/0165688 A1 | 7/2007 | Lee | |
| 2008/0175588 A1 * | 7/2008 | Bernard et al. | 398/17 |
| 2008/0247766 A1 * | 10/2008 | McCaul et al. | 398/202 |
| 2009/0047026 A1 * | 2/2009 | Luo | 398/135 |
| 2009/0074411 A1 * | 3/2009 | Bernard et al. | 398/58 |

OTHER PUBLICATIONS

"Optical Networks: A Practical Perspective" by R. Ramaswami et al., Morgan Kaufmann, 1998, pp. 143-144 and 177-180.*

* cited by examiner

*Primary Examiner* — Shi K Li
(74) *Attorney, Agent, or Firm* — Maschoff Brennan (57) ABSTRACT

An optical transceiver includes an electric terminal that can receive power from a host equipment and provide a power supply voltage to the optical transceiver, and a power failure monitor circuit that can detect an imminent loss of the power supply voltage. The power failure monitor circuit can produce a dying-gasp control signal when such imminent loss of power supply voltage is detected or when a disabling control signal is received from the host equipment. A driver can receive the dying-gasp control signal. An optical transmitter is powered by the power supply voltage and can emit a first optical signal under the control of the driver. The driver can modulate an envelope of the first optical signal in response to the dying-gasp control signal to produce a modulated envelope comprising a first dying gasp signal.

11 Claims, 9 Drawing Sheets

SMART OPTICAL TRANSCEIVER HAVING INTEGRATED OPTICAL DYING GASP FUNCTION

BACKGROUND

The present disclosure relates to the detection of remote equipment failures in an optical network system.

As the Internet, voice over Internet Protocol (VoIP), and Internet Protocol television (IPTV) grow in popularity, more and more users desire to have access to these services from their premises. Likewise, businesses now require more and more bandwidth delivered to their premises with necessary quality of service. In order to meet the growing bandwidth demand, optical fibers are being laid to cover more areas, often directly linked to the customer premises. Different types of communication equipment such as xDSL, xPON, WDM, ROADM, etc. are being deployed cross optical networks. Service providers' networks are becoming more and more complex than ever before. Network manageability and serviceability are becoming key challenges for service providers to ensure service level agreement (SLA) and guarantee customer satisfaction.

One of the most common failures in optical networks is optical loss of signal (LOS). LOS can be caused by many reasons such as fiber cut, remote power and/or equipment failures. In order to determine the failure points and causes for the failures, service providers often dispatch service technicians with necessary diagnostic tools, equipment, and spare parts to the field or remote sites, which is known as "truck roll". Tuck-roll accounts for significant portion of operational expenses for service providers.

Conventional optical transceivers can assert LOS or de-assert SD (signal detect) indication signal when the received optical power is less than a predetermined level. However, it does not provide enough information for further determining the root causes of the LOS.

Capabilities of remote detection of power failure can help service providers to avoid unnecessary truck-rolls. "Dying gasp" refers to a function of reporting, through the optical network, a power supply problem experienced by an optical device at a remote site. "Dying gasp" can be conducted, for example, via Ethernet operation administration and management (OAM) in an optical network. Conventional "Dying gasp", such as the one defined in IEEE specification, requires interoperability between equipment at the failure location and the detecting point of the optical connection. In practice, interoperability often requires additional demarcation equipment to be deployed at the remote site, which results in additional equipment and labor costs.

There is therefore a need for a dying gasp function that is simple and cost effective.

SUMMARY

In a general aspect, the present invention relates to an optical transceiver that includes an electric terminal that can receive power from a host equipment and to provide a power supply voltage to the optical transceiver; a power failure monitor circuit that can detect an imminent loss of the power supply voltage, wherein the power failure monitor circuit can produce a dying-gasp control signal when such imminent loss of power supply voltage is detected or when a disabling control signal is received from the host equipment; a driver that can receive the dying-gasp control signal; and an optical transmitter powered by the power supply voltage and can emit a first optical signal under the control of the driver, wherein the driver can modulate an envelope of the first optical signal in response to the dying-gasp control signal to produce a modulated envelope comprising a first dying gasp signal.

In yet another general aspect, the present invention relates to an optical transceiver that includes an electric terminal that can receive power from a host equipment and to provide a power supply voltage to the optical transceiver; a micro control unit that can detect an imminent loss of the power supply voltage, wherein the micro control unit can produce a dying-gasp control signal when such imminent loss of power supply voltage is detected or when a disabling control signal is received from the host equipment; a driver that can receive the dying-gasp control signal; an optical transmitter powered by the power supply voltage and can emit a first optical signal under the control of the driver, wherein the driver can modulate an envelope of the first optical signal in response to the dying-gasp control signal to produce a modulated envelope comprising a first dying gasp signal; and an optical receiver that can receive a second optical signal having an envelope modulation that carries a second dying gasp signal from an optical network device, wherein the micro control unit can identify the second dying gasp signal in the envelope of the second optical signal.

In yet another general aspect, the present invention relates to optical receiver that includes an optical receiver that can receive a first dying gasp signal from a remote optical network device; a dying gasp detector that can extract the first dying gasp signal from the envelope of the second optical signal; and a computer memory that can store a dying gasp status of the remote optical network device.

In yet another general aspect, the present invention relates to an optical communication system that includes a first optical device that includes an electric terminal that can receive power from a host equipment and to provide a power supply voltage to the optical transceiver; a power failure monitor circuit that can detect an imminent loss of the power supply voltage, wherein the power failure monitor circuit can produce a dying-gasp control signal when an imminent loss of power supply voltage is detected or when a disabling control signal is received from the host equipment; a driver that can receive the dying-gasp control signal; and an optical transmitter powered by the power supply voltage and can emit an optical signal under the control of the driver, wherein the driver can modulate an envelope of the optical signal in response to the dying-gasp control signal to produce a modulated envelope comprising a dying gasp signal. The optical communication system also includes a second optical device comprising an optical receiver that can receive the optical signal having the modulated envelope from the first optical device; and a dying gasp detector that can extract the dying gasp signal from the modulated envelope of the optical signal.

Implementations of the systems and methods may include one or more of the following. The driver can modulate the envelope of the first optical signal to produce a sequence of optical pulses in the first optical signal, the sequence of optical pulses comprising the first dying gasp signal. The sequence of optical pulses can include alternate on and off in the optical power of the first optical signal. The driver can include an enable/disable control that can turn on or off the output of the optical transmitter, wherein the dying-gasp control signal controls to enable/disable control to turn on or off the output power of the optical transmitter to produce the sequence of optical pulses. A time interval between adjacent optical pulses can be in a range between 0.01 ms and 5 ms. The power failure monitor circuit can include a voltage comparator that can compare the power supply voltage with a predetermined threshold voltage; and a dying gasp signal generator that can generate the dying-gasp control signal when the power supply voltage falls below the predetermined threshold voltage. The driver and the optical transmitter can modulate the envelope of the first optical signal when the voltage comparator detects that the power supply voltage falls below the predetermined threshold voltage. The optical transceiver can operate at a nominal power supply voltage under normal operations, wherein the optical transceiver fails to function when the power supply voltage falls below a minimum voltage, wherein the predetermined threshold voltage is between the nominal power supply voltage and the minimum voltage. The driver and the optical transmitter can modulate the envelope of the first optical signal when the power failure monitor circuit detects an imminent loss of the power supply voltage. The disabling control signal from the host equipment can control the driver to stop the optical transmitter from emitting the first optical signal. The first dying gasp signal can have a waveform selected from a plurality of predetermined patterns each indicating a different root cause of for the imminent loss of the power supply voltage. The optical transceiver can further include a reception electrical interface configure to receive a first electrical signal, wherein the optical transmitter can emit the first optical signal in response to the first electrical signal, wherein the reception electrical interface is in compliance with a standard selected from the group consisting of SFF, SFP, XFP, and SFP+. The optical transceiver can further include an optical receiver that can receive a second optical signal having an envelope modulation that carries a second dying gasp signal from an optical network device; and a dying gasp detector that can extract the second dying gasp signal from the envelope of the second optical signal.

Embodiments may include one or more of the following advantages. The disclosed optical transceiver and methods provide more diagnostic information for optical LOS at a shorter response time. The functions of the optical transceivers can be enriched by optical-layer dying gasp, which is not available in conventional optical transceivers. "Dying gasp" monitoring, reporting and detection can be provided by optical-layer communications, which usually respond faster that upper layer communications used in "dying gasp" in some convention optical network systems.

The disclosed optical transceiver can generate different optical dying gasp signals for different LOS scenarios that include but are not limited to host equipment power failure, transmitter disabled by host, transmitter self protection shut down and pulling out of a unlatched transmitter. The disclosed optical transceiver generates no optical dying gasp in the case of LOS caused by a fiber cut. The disclosed optical transceiver therefore allows the optical networks to distinguish all above different LOS scenarios.

The disclosed optical-layer dying gasp can be provided without additional overhead to user data and the host equipment into which the optical transceivers are plugged. The disclosed optical transceiver and methods can eliminate the need for demarcation equipment in some conventional optical network systems using conventional optical transceivers. The disclosed optical transceivers and methods do not require costly implementation such as digital wrapper or extra interoperable equipment at the remote sites.

Moreover, the disclosed optical transceiver can be implemented as a passive device which receives electric power from the host equipment into which it is plugged. Furthermore, the disclosed optical transceiver can be compliant with industry-standard optical transceiver formats.

Although the specification has been particularly shown and described with reference to multiple embodiments, it will be understood by persons skilled in the relevant art that various changes in form and details can be made therein without departing from the spirit and scope of the specification.

DETAILED DESCRIPTION

Figure 1:
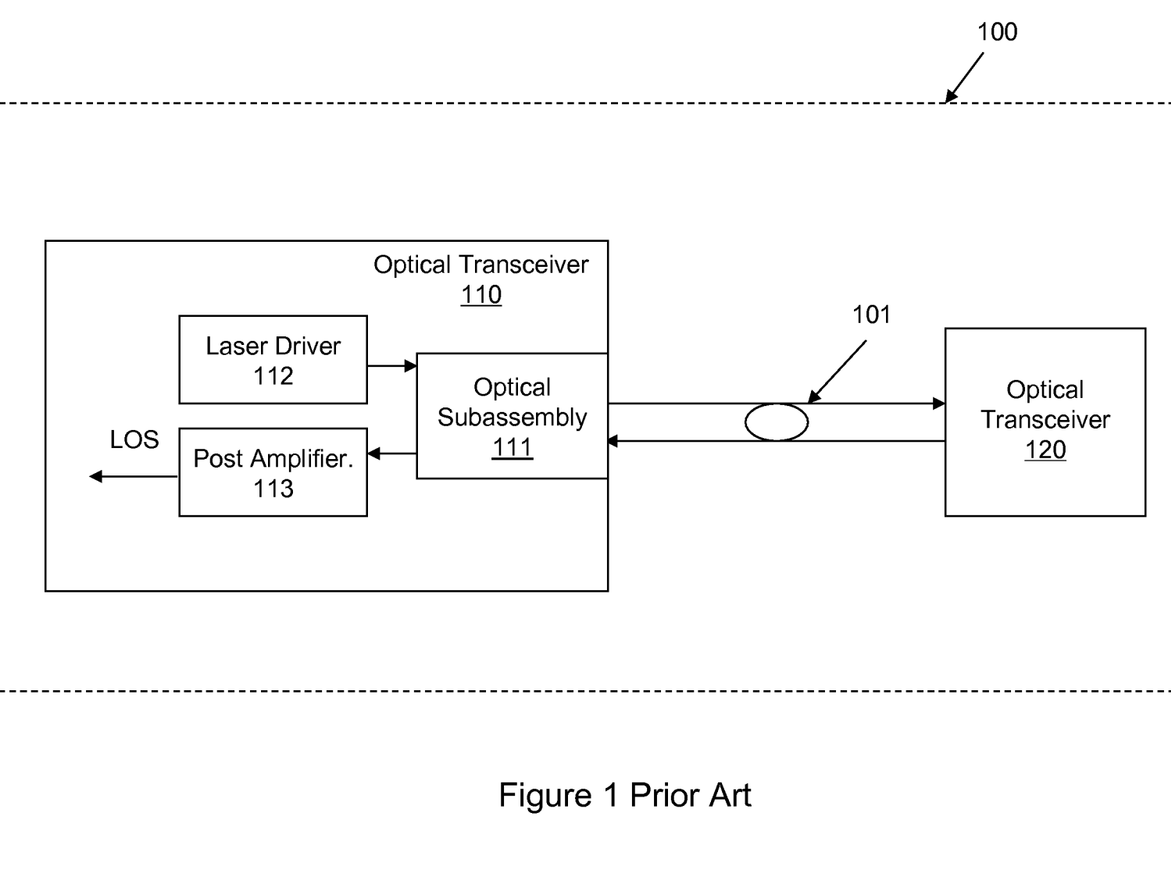
FIG. 1 is a block diagram for an optical connection comprising a pair of transceivers connected by an optical fiber link.

Referring to FIG. 1, a conventional optical connection 100 includes optical transceiver 110 and 120 that are at different locations and can communicate in optical signals via an optical link 101. The optical link 101 can for example include a single optical fiber, or a cable containing a bundle of optical fibers. The optical transceiver 110 includes an optical subassembly 111, a driver 112, and a post amplifier 113. The optical subassembly 111 can further include a transmitter optical subassembly (TOSA) and a receiver optical subassembly (ROSA). The optical subassembly 111 can also be a bidirectional optical subassembly (BOSA).

When the power level of optical signals received by the optical transceiver 110 is lower than a predetermined level, the post amplifier 113 can produce a loss of signal (LOS) indicating a failure of the optical connection with the optical transceiver 120. Loss of optical power at optical transceiver 110 can be caused by many problems. The most common reasons for LOS include fiber cut on optical link 101 and power supply failure at the optical transceiver 120. While serving as an alert to the failure in the optical system, however, a LOS signal typically does not include sufficient information for allocating the root cause of the failure, which prevents quick restoration of the optical connection.

When a LOS occurs, it is highly desirable that service provider personnel are not only alerted by such an event via the network management system, but also can be provided with information that can help them to determine the failure points and causes for the failures. These capabilities require service providers to be capable of monitoring and diagnosing not only the optical power, but also the power supply of the optical transceiver at customer premises.

Figure 2:
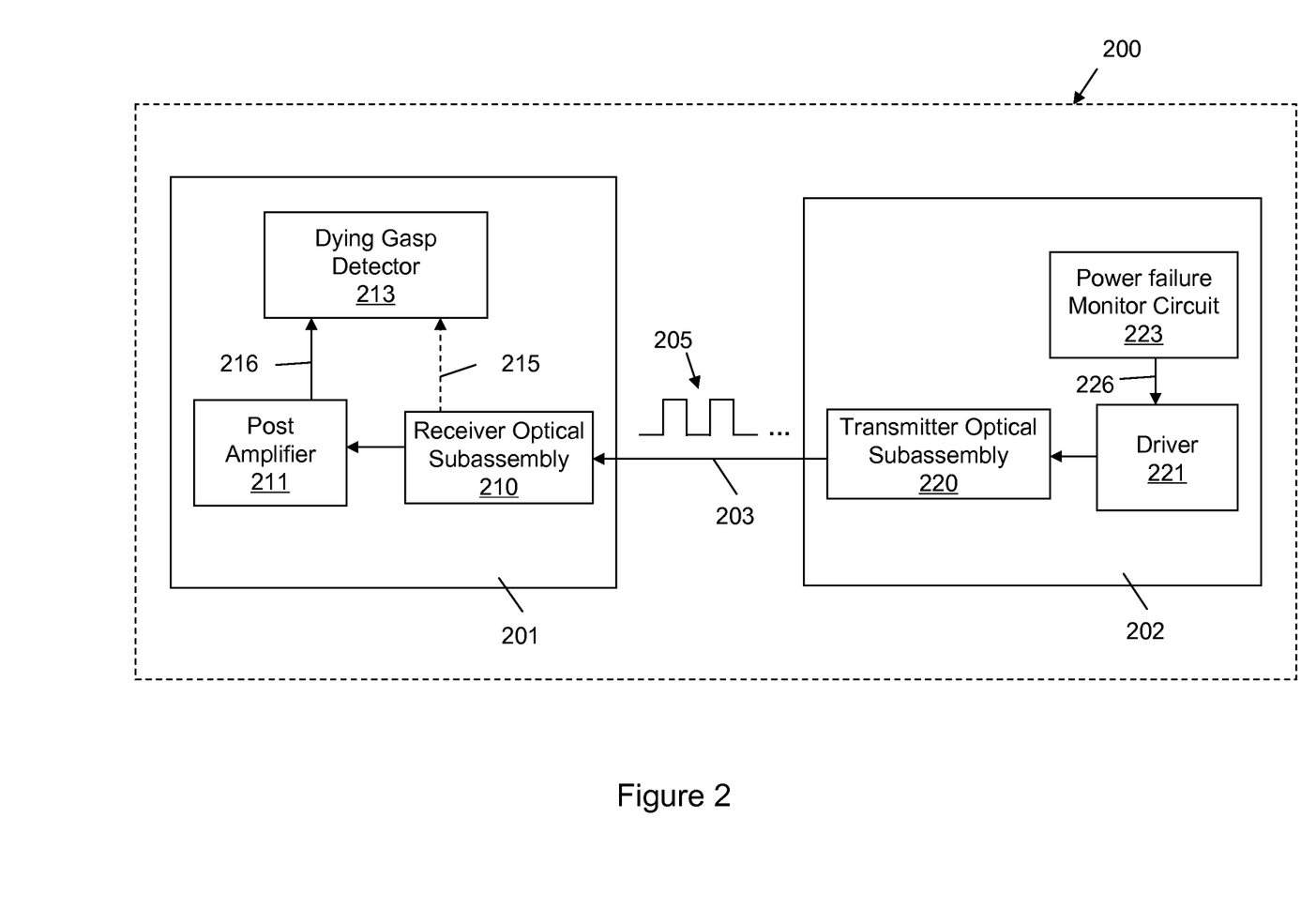
FIG. 2 is a block diagram for an optical connection including an optical transmitter capable of generating "dying gasp" signals and an optical receiver capable of receiving "dying gasp" signals in accordance with the present invention.

In accordance to the present invention, referring to FIG. 2, an optical connection 200 includes an optical receiver 201 and an optical transmitter 202 that are connected via an optical link 203. The optical link 203 can be implemented by a single optical fiber, or a cable containing a bundle of optical fibers. The optical receiver 201 includes an ROSA 210, a post amplifier 211, and a dying gasp detector 213. At the other end of the optical link 203, the optical transmitter 202 includes a TOSA 220, a driver 221, and a power failure monitor circuit 223.

When a power failure event occurs in the optical transmitter 202, the power failure monitor circuit 223 detects such event and immediately sends a dying gasp signal 226 to the driver 221. Before power supply completely dies out, the driver 221 drives the TOSA 220 and sends out an optical dying gasp signal 205 through the optical link 203. The optical receiver 201 receives the optical dying gasp signal 205 at the other end of the optical link 203. The optical dying gasp signal 205 is converted by the ROSA 210 to an electrical dying gasp signal 215, which is further received by a dying gasp detector 213. The electrical dying gasp signal can also be further amplified by a post amplifier 211, which sends an electrical dying gasp signal 216 to the dying gasp detector 213.

Conventionally, optical network systems generate and process power failure dying gasp signals at the protocol layer, most commonly through operation administration and management (OAM) messages. But the conventional approach requires equipments at both ends of an optical connection to be fully interoperable. Interoperability, however, does not always exist between two ends of an optical connection because network equipments often have different vintages and of different grades (carrier-grade vs. enterprise grade), or are owned and operated by different parties (e.g. service providers and customers), or maintained by different practices (carrier-grade vs. enterprise grade). To assure interoperability, service providers often have to install additional interoperable equipment (i.e. demarcation equipment) at remote sites. The equipment are typically owned and maintained by service providers. This practice is costly in both equipment expenditure and operation complexity.

To address this drawback, the systems and methods disclosed in the present application provide dying gasp function at the optical layer. The dying gasp function is integrated into optical transceivers. Protocol and operational differences between network equipment at different ends of optical connects are no longer issues. The dying gasp function does not require OAM layer interoperability between network equipments.

The disclosed systems and methods are capable of producing dying gasp signal at much faster response speed. Dying gasp signal are generally required to be sent out before power drops to a level at which where the circuits can no longer operate properly. Conventional dying gasp communicates in the protocol layer and requires much longer time because OAM messages in the protocol layer can only be transmitted below an upper limit (a predetermined number of frames per second) and cannot be transmitted immediately. For example, transmitting a dying gasp signal over an Ethernet OAM requires 10~20 ms of time. The communication in the protocol layer requires high power-consumption chips, such as processor and Ethernet switch, which results in bulky and expensive power supply design. In contrast, dying gasp in the present invention system is processed purely in the optical layer. There is no need for high power consumption chips operating in the protocol layer in the conventional systems. Entire process of dying gasp detection and processing can be achieved in less than 1 ms.

Moreover, electrical, optical, mechanical and control interfaces of the disclosed optical transceivers having integrated optical-layer dying gasp function can be in compliance with industry standards and specifications such as GBIC, SFF, SFP, XFP, X2, XENPAK and SFP+.

Figure 3A:
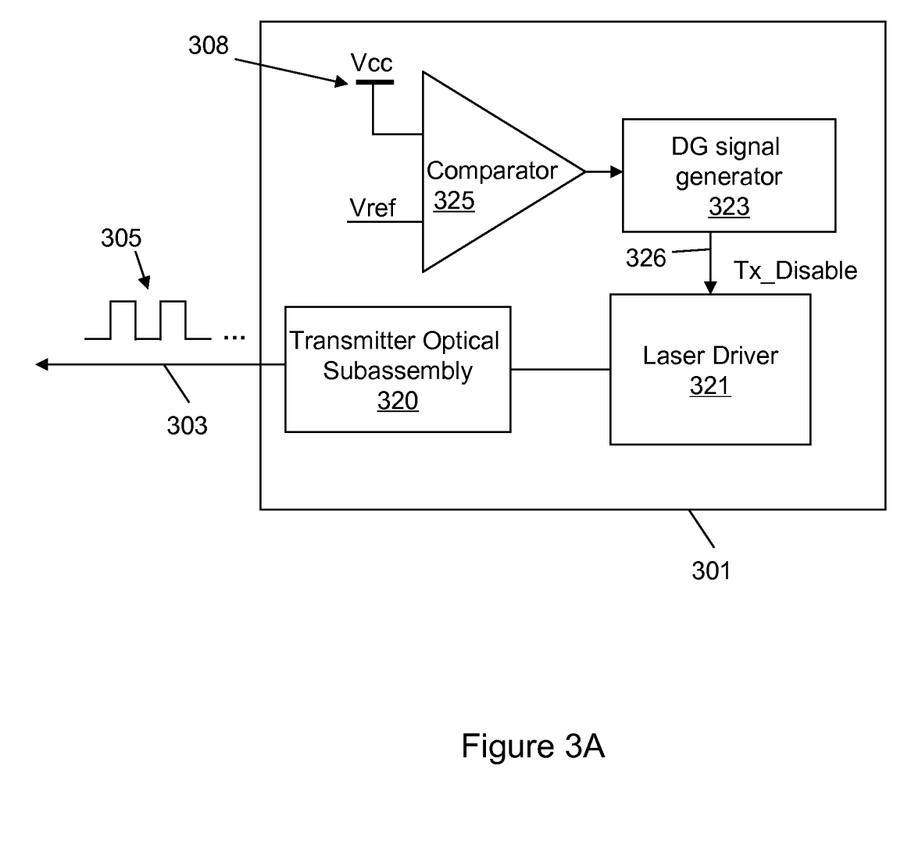
FIG. 3A illustrates an exemplified optical transmitter capable of generating dying gasp signals.

In some embodiments, referring to FIG. 3A, a transmitter 301 with integrated optical-layer dying gasp function includes a voltage comparator 325, a DG signal generator 323, a driver 321, and an optical transmitter subassembly 320. A dying gasp signal can be generated by the voltage comparator 325 and the disable/enable control of the laser driver 321. The voltage comparator 325 compares voltage Vcc at a power supply electric terminal 308 with a pre-selected voltage reference Vref. Vref usually is below the lowest voltage of the power supply range for normal operations and above a minimal operation voltage below which the transmitter 301 no longer functions. When Vcc drops below Vref, the voltage comparator 325 immediately emits a power failure trigger signal to trigger the DG signal generator 323 to output a dying gasp control signal 326. The dying gasp control signal 326 can have a predetermined digital 1/0 pattern, which can be directly connected to "transmission disable" (Tx_disable) input of the driver 321. Consequently, the driver 321 controls the TOSA 320 and sends out an optical dying gasp signal 305 via an optical link 303. The optical dying gasp signal 305 can be generated by the driver 321 by alternately turning the optical output power on and off in the optical transmitter subassembly 320.

Figure 3B:
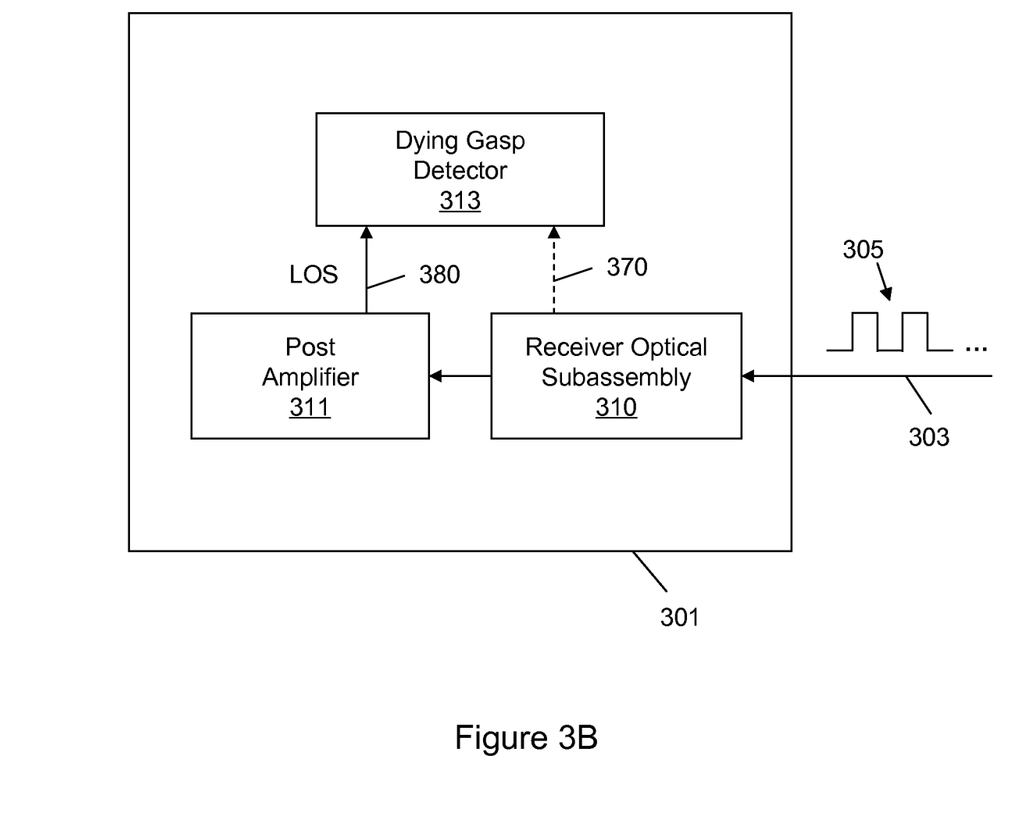
FIG. 3B illustrates an exemplified optical receiver capable of detecting dying gasp signals.

Referring to FIG. 3B, the optical dying gasp signal 305 can be detected by a receiver 301 that is connected to the optical link 303 at the other end of the optical connection. A receiver optical subassembly 310 converts the received optical signals to electrical signals. A post amplifier 311 further amplifies the electrical signals and outputs a LOS signal 380 in response to the on/off pattern in the optical dying gasp signal 305 received by receiver optical subassembly 310. The LOS signal asserts and de-asserts according to the on/off pattern in the optical dying gasp signal 305. The dying gasp detector 313 can detect dying gasp event by comparing the on/off pattern in the LOS signal 380 with a predetermined digital 1/0 pattern.

Figure 3C:
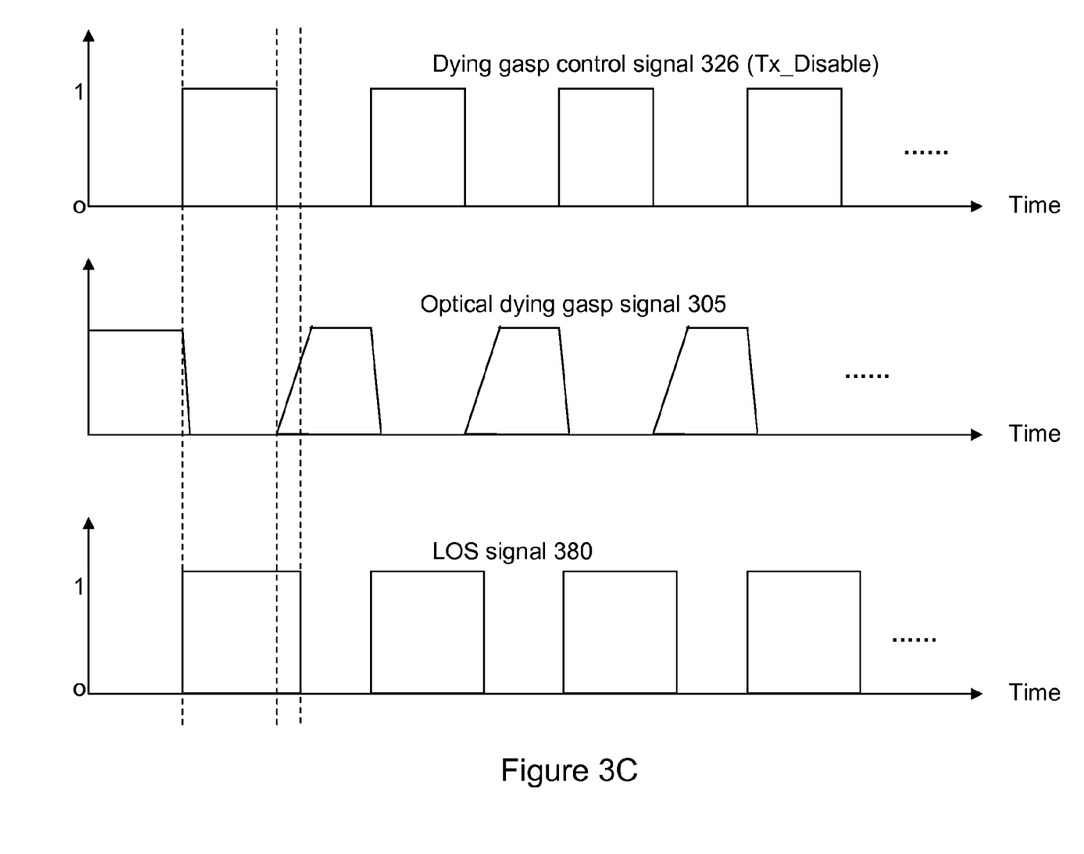
FIG. 3C illustrates exemplified waveforms for the signals related to dying gasp function shown in FIGS. 2, 3A, and 3B.

FIG. 3C illustrates exemplified waveforms for the dying gasp control signal 326, the optical dying gasp signal 305, and the LOS signal 380 shown in FIGS. 3A and 3B. The dying gasp control signal 326 in FIG. 3A can include a time sequence of periodic (1/0) voltage pulses. The falling edge of the voltage pulses in the dying gasp control signal 326 can trigger the driver 321 and in turn the transmitter optical subassembly 320 to emit an optical pulse in the optical dying gasp signal 305. Usually, the turn-on time for a laser pulse is longer than its turning-off time. An optical pulse in the optical dying gasp signal 305 thus tends to have a delayed ramp-up edge and a sharp falling edge. The post amplifier 311 (FIG. 3B) outputs LOS signal 380 in response to the power level of the optical pulses in the optical dying gasp signal 305. In addition, there is hysteresis between LOS assertion and de-assertion. As a result, the LOS signal 380 has a different duty-cycle depending on laser turn on time and power level received by the receiver optical subassembly 310. Typical time interval between adjacent optical pulses can range from 10 μs to 5 ms.

The above described dying gasp function utilizes existing Tx_Disable and LOS signals in conventional transceivers without requiring additional device and circuits. Thus the disclosed optical-layer dying gasp function is simple and cost effective, and can be easily integrated into optical transceivers.

Optical dying gasp signal 305 described above is generated using Tx_disable control at the laser driver 321 and comprises a predetermined optical power waveform. In according to the present invention, optical dying signals can also be generated and detected without utilizing Tx_Disable, and/or LOS signals. For example, the dying gasp control signal 326 in FIG. 3A can be formed by an analog signal output by the laser driver 321. Then the laser driver 321 controls TOSA 320 and varies optical output power accordingly. Similarly in FIG. 3B, the receiver 301 receives optical input signal and outputs an optical power monitoring signal 370 in response to optical power variation in the optical dying gasp signal 305. The dying gasp detector 313 can detect dying gasp event by comparing the wave pattern in signal 370 with a predetermined dying gasp event pattern.

Figure 4:
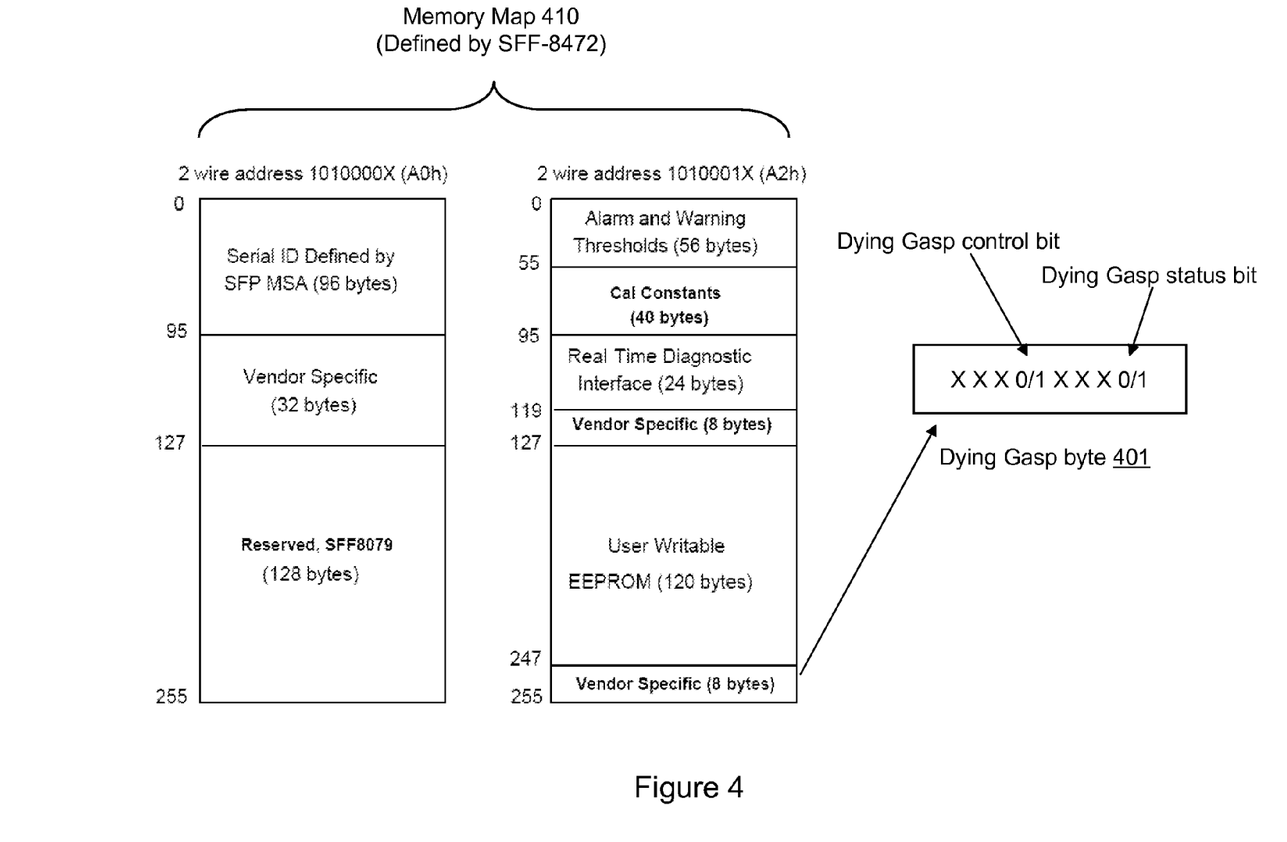
FIG. 4 is an exemplified block diagram of a digital diagnostic memory map with dying gasp control/status expansion.

Diagnostic monitoring interface of generic optical transceivers is defined by Small Form-Factor Committee in a SFF-8472 document published in 2004. Referring to FIG. 4, a memory map 410 under SFF-8472 defines two memory blocks that are accessible via I2C interface respectively at addresses A0h and A2h. In order to manage and monitor dying gasp function, a new dying gasp byte 401 is defined. The dying gasp byte 401 can include a dying gasp control bit for enabling or disabling dying gasp function. When the dying gasp function is disabled (e.g. when the dying gasp control bit is at 0), no dying gasp signal is generated in event of a power failure. The dying gasp byte 401 can further include a dying gasp status bit for indicating if a dying gasp signal has been received. The dying gasp byte 401 can be defined as a memory extension over SFF-8472 and allocated at either a vendor specific or reserved address in memory map 410, which makes it fully compatible with the SFF-8472 standard. The above described dying gasp function and its diagnostic management memory extension can be implemented to be in compliant with to industry optical transceiver standards and specifications such as GBIC, SFF, SFP, XFP, X2, XENPAK and SFP+.

Figure 5:
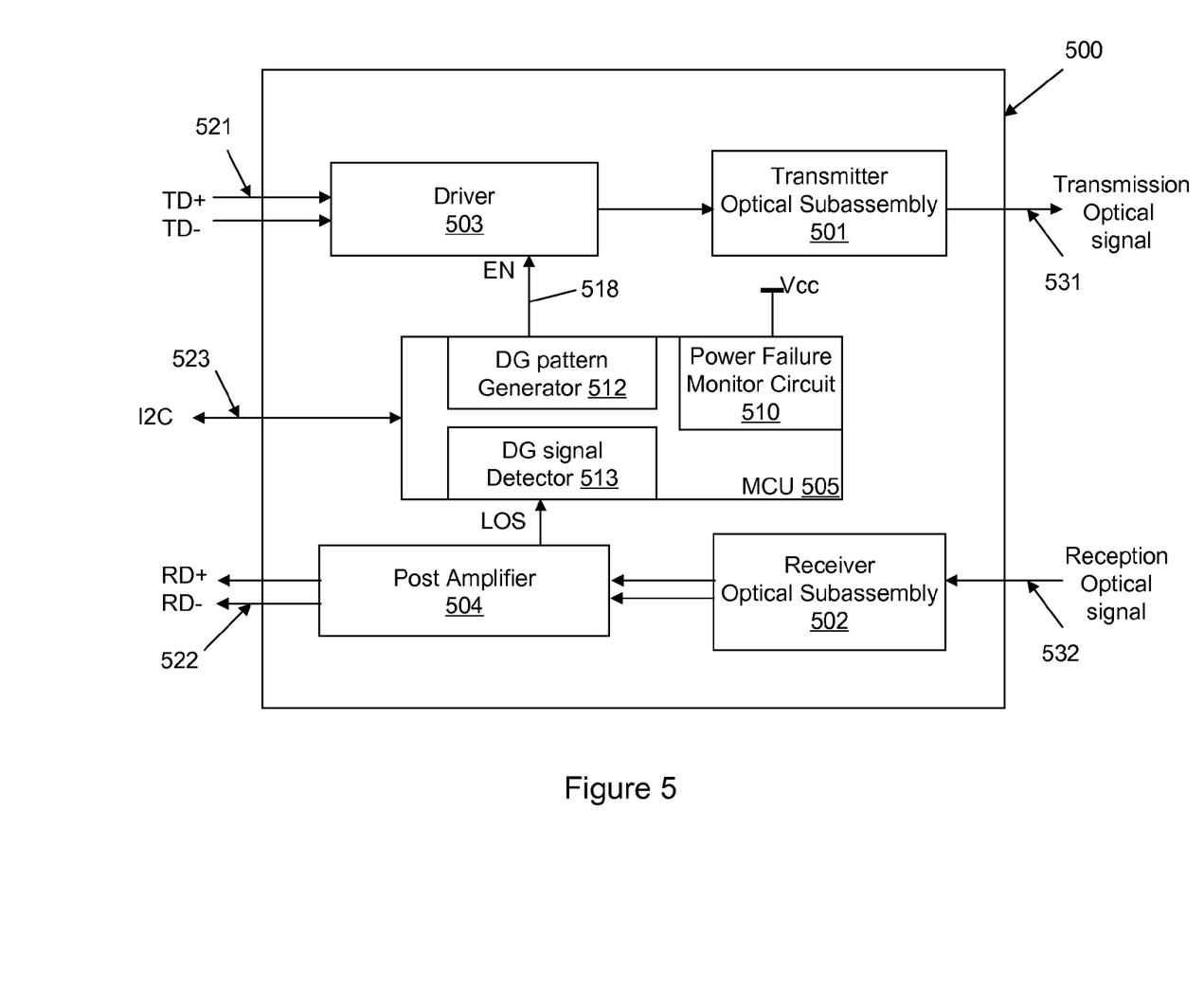
FIG. 5 is an exemplified block diagram of a smart SFP transceiver having integrated dying gasp signal generation and detection capabilities.

Although a unidirectional optical connection is shown in FIG. 2, the disclosed dying gasp functions are compatible with bidirectional optical connections. Referring to FIG. 5, a bidirectional transceiver 500 is capable of reporting an imminent power failure of its own as well as detecting a power failure event at a remote network device that the transceiver 500 is connected with. The transceiver 500 includes a TOSA 501, a ROSA 502, a laser diver 503, and a post amplifier 504. The transceiver 500 can be compatible with small form factor pluggable (SFP) having its associated standard electrical and optical interfaces, configured to transmit input data 521, to receive output data 522, to transmit optical signal 531, and to receive optical signal 532. The transceiver 500 can be deployed at either or both ends of an optical connection (for example, the optical receiver 201 and the optical transmitter 202 in the optical connection 202 in FIG. 2 can be replaced by a bidirectional transceiver 500). The transceiver 500 can be plugged into a host network equipment via standard reception and transmission electrical interfaces.

The transceiver 500 includes a micro controller unit (MCU) 505 that can have pre-stored software blocks enabling dying gasp function, which can include a power failure monitor circuit 510, a DG pattern generator 512, and a DG signal detector 513. The power-failure monitor circuit 510 can monitor the voltage Vcc of the power supply either by a built-in function in the MCU 505, or through an A/D conversion input. The power-failure monitor circuit 510 can generate an event signal instantaneously whenever the voltage Vcc of the power supply falls below a predetermined threshold. When the dying gasp control bit is asserted (dying gasp function enabled), trigged by the event signal, the DG pattern generator 512 immediately sends out an "optical dying gasp" signal 518 in a predetermined voltage pattern. The "optical dying gasp" signal 518 can control and enable/disable input of the driver 503, which can turn the TOSA 501 on and off to produce "optical dying gasp" signal 531. The "optical dying gasp" signal 531 is timely generated before Vcc falls to a point below which the optical transceiver 500 fails to function. For example, Vcc may be nominally at 3.3 volts for normal operations. The absolute minimum operation Vcc for the optical transceiver 500 is 2.7 volts. The power threshold can be set at 3.1 volt. The optical dying gasp signaling process should be completed after Vcc falls below 3.1 volts but before it reaches 2.7 volts.

The driver 503 includes an enable/disable control that is configured to turn on or off the output of the TOSA 501. The optical pulses in the "optical dying gasp" signal 531 are produced by toggling enable/disable control to turn on or off the output of the TOSA 501.

For dying gasp signal detection, the reception optical signal 532 is received by the ROSA 502 and amplified by the post amplifier 504. When a LOS signal is detected from the post amplifier 504, the DG signal detector 513 further monitors the LOS signal and/or received optical power signal for a short period of time to identify a predetermined dying gaps pattern in the LOS signal and/or received optical power signal. If the pattern is verified, a dying gasp status bit in its diagnostic memory map is set and can be accessed via the I2C interface 523.

Figure 6:
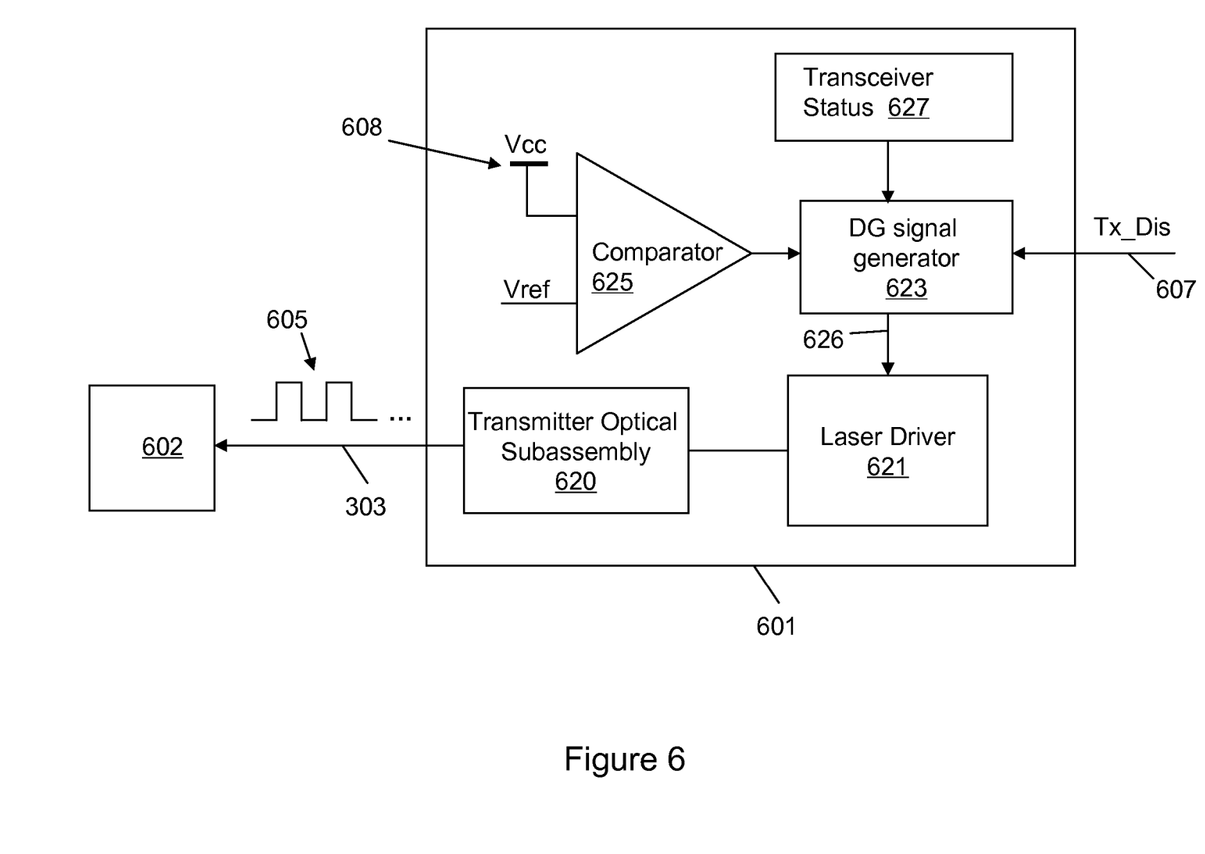
FIG. 6 is an exemplified block diagram of an optical transceiver capable of generating different waveform patterns for dying gasp signals indicating different failure scenarios.

Besides remote power supply failure, there are many other root causes that can trigger a LOS event. Referring to FIG. 6, a transmitter 601 with enhanced optical-layer dying gasp function includes a voltage comparator 625, a DG signal generator 623, a transceiver status 627, a laser driver 621, an optical transmitter subassembly 620, and an electric terminal 608 for providing a power supply voltage Vcc to the transmitter 601.

The DG signal generator 623 can receive inputs from multiple trigger sources including the voltage comparator 625, transceiver status 627, and Tx_D is input (a signal to disable the transmitter 601) from host equipment. Triggered by one or more inputs, the DG signal generator 623 can output a dying gasp control signal 626, which is in connection with laser driver 621. The laser driver 621 controls the TOSA 620 and sends out an optical dying gasp signal 605 via an optical link 303. Some steps of failure detection and generation of dying gasp signal can be the same as or similar to the corresponding steps as described in conjunction with the transmitter 301 in FIG. 3A.

The dying gasp control signal 626, consequently the optical dying gasp signal 605, can have different analog waveforms or digital 1/0 patterns for different failure scenarios. For example, in case of power supply failure, the optical dying gasp signal 605 can have one waveform in case of host disabled transmitter and a different waveform in case of other root causes. In general, the optical dying gasp signal 605 can have many other different patterns.

Figure 7A:
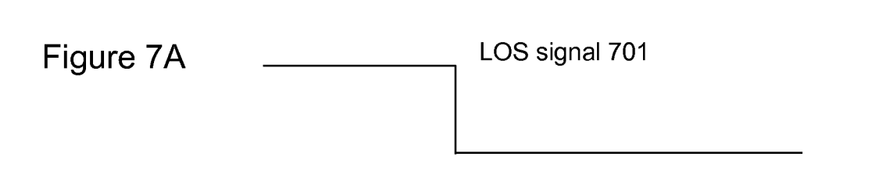
FIGS. 7A-7C illustrate exemplified optical power waveforms at different failure scenarios for the optical transceiver shown in FIG. 6.
Figure 7B:
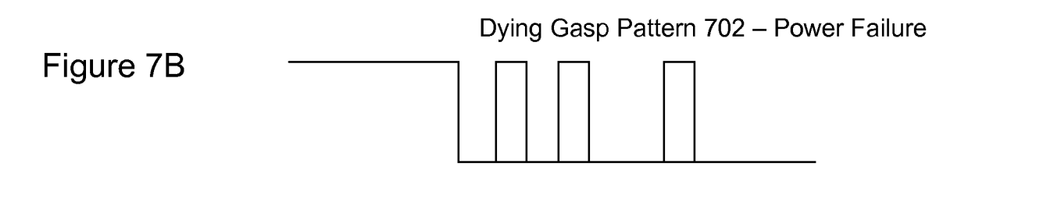
Figure 7C:
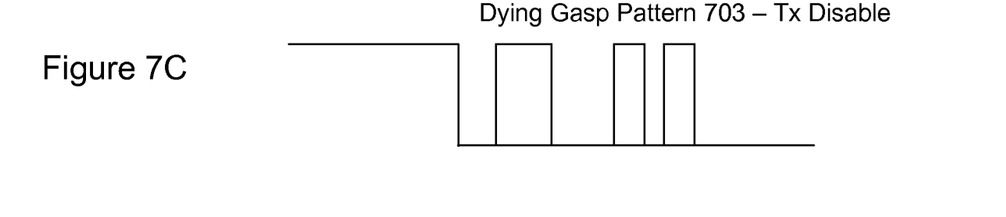

An optical receiver 602 can determine the root cause of the failure by comparing the received LOS and dying gasp signals with predetermined waveforms. As illustrated in FIG. 7A, if the optical receiver 602 receives a simple LOS signal 701, the root cause for the power failure should most likely be fiber cut. If a dying gasp pattern 702 is received, as shown in FIG. 7B, remote host equipment power failure is then determined to be the root cause. Similarly, a dying gasp pattern 703 shown in FIG. 7C can indicate that the remote transmitter is disabled by its host equipment.

The above described dying gasp function can provide network failure information in many different types of LOS events, which may be caused by fiber cut, power failure of the remote host equipment, the disabling of the remote optical transmitter by its host equipment, the self-protection shutdown of the remote transmitter, and pulling out of the remote optical transceiver if unlatched.

It is understood that the specific configurations and parameters described above are meant to illustration the concept of the specification. The disclosed apparatus and methods can be compatible with variations of configurations and parameters without deviating from the spirit of the present invention. For example, it is understood that the logic functions such as voltage comparator, DG signal generator, and Dying gasp detector are used above only to illustrate the invention concepts. The logic functions can be realized by other logically equivalent circuits or by software in a micro controller unit in the optical transceivers. The disclosed optical transceivers can include additional components or have different construction as described above. The disclosed optical transceivers can be compatible with other standards not listed in the above description. The waveforms for dying gasp related signals can also differ from the exemplified waveforms illustrated in the drawings. The disclosed optical transceiver can generate different optical dying gasp signals in response different LOS scenarios, including not only to a power failure in the device, but also fiber cut, host equipment power failure, disabling of the transceiver by its host equipment, and so on.

What is claimed is:

1. An optical transceiver, comprising:
   an electric terminal configured to receive power from a host equipment and to provide a power supply voltage to the optical transceiver;
   a power failure monitor circuit integrated in the optical transceiver, where the power failure monitor circuit is configured to detect an imminent loss of the power supply voltage, wherein the power failure monitor circuit is configured to produce a dying-gasp control signal when such imminent loss of power supply voltage is detected or when a disabling control signal is received from the host equipment;
   a driver configured to receive output data and the dying-gasp control signal; and
   an optical transmitter powered by the power supply voltage and configured to emit a first optical signal under the control of the driver, wherein the driver and the optical transmitter are configured to produce an optical-layer dying-gasp signal in response to the dying-gasp control signal.

2. The optical transceiver of claim 1, wherein the driver is configured to modulate an envelope of the first optical signal to produce a sequence of optical pulses in the first optical signal, the sequence of optical pulses comprising the first dying gasp signal.

3. The optical transceiver of claim 2, wherein the sequence of optical pulses comprises alternate on and off in the optical power of the first optical signal.

4. The optical transceiver of claim 2, wherein the driver comprises an enable/disable control configured to turn on or off the output of the optical transmitter, wherein the dying-gasp control signal controls to enable/disable control to turn on or off the output power of the optical transmitter to produce the sequence of optical pulses.

5. The optical transceiver of claim 2, wherein a time interval between adjacent optical pulses is in a range between 0.01 ms and 5 ms.

6. The optical transceiver of claim 1, wherein the power failure monitor circuit comprises:
   a voltage comparator configured to compare the power supply voltage with a predetermined threshold voltage; and
   a dying gasp signal generator configured to generate the dying-gasp control signal when the power supply voltage falls below the predetermined threshold voltage.

7. The optical transceiver of claim 6, wherein the driver and the optical transmitter are configured to modulate an envelope of the first optical signal when the voltage comparator detects that the power supply voltage falls below the predetermined threshold voltage.

8. The optical transceiver of claim 6, wherein the optical transceiver operates at a nominal power supply voltage under normal operations, wherein the optical transceiver fails to function when the power supply voltage falls below a minimum voltage, wherein the predetermined threshold voltage is between the nominal power supply voltage and the minimum voltage.

9. The optical transceiver of claim 1, wherein the driver and the optical transmitter are configured to modulate an envelope of the first optical signal when the power failure monitor circuit detects an imminent loss of the power supply voltage.

10. The optical transceiver of claim 1, wherein the disabling control signal from the host equipment is configured to control the driver to stop the optical transmitter from emitting the first optical signal.

11. The optical transceiver of claim 1, further comprising a reception electrical interface configure to receive a first electrical signal, wherein the optical transmitter is configured to emit the first optical signal in response to the first electrical signal, wherein the reception electrical interface is in compliance with a standard selected from the group consisting of SFF, SFP, XFP, and SFP+.

* * * * *